United States Patent
Glickman et al.

(10) Patent No.: US 8,081,760 B2
(45) Date of Patent: Dec. 20, 2011

(54) OFFLINE MESSAGE SECURITY VIA SELECTIVE DATA REPLICATION

(75) Inventors: Kathryn A. Glickman, Lincoln, MA (US); Niklas Heidloff, Salzkotten (DE); Paul B. Moody, Hyde Park, VT (US); Michael O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1505 days.

(21) Appl. No.: 10/849,600

(22) Filed: May 20, 2004

(65) Prior Publication Data

US 2005/0262207 A1 Nov. 24, 2005

(51) Int. Cl.
*H04L 9/08* (2006.01)

(52) U.S. Cl. .................................. 380/277; 380/278

(58) Field of Classification Search .................. 709/206; 380/277, 278, 279
See application file for complete search history.

(56) References Cited

U.S. PATENT DOCUMENTS

| | | | | |
|---|---|---|---|---|
| 6,615,241 | B1 * | 9/2003 | Miller et al. | 709/206 |
| 2003/0196080 | A1 * | 10/2003 | Karman | 713/150 |
| 2005/0228864 | A1 * | 10/2005 | Robertson | 709/206 |

* cited by examiner

*Primary Examiner* — Edward Zee
(74) *Attorney, Agent, or Firm* — Steven M. Greenberg, Esq.; Carey, Rodriguez, Greenberg & O'Keefe

(57) ABSTRACT

A method, system and apparatus for the offline securing of messages through selective security data replication. A method for selectively replicating security data for offline processing of electronic messages can include identifying a messaging partner associated with the electronic message responsive to processing an electronic message. Subsequently, it can be determined whether electronic messages previously had been received from or transmitted to the identified messaging partner. If it is determined that electronic messages previously had been received from or transmitted to the identified messaging partner, identifying information for the identified messaging partner can be added to a batch listing. Consequently, during a replication process, security data can be selectively replicated from an external repository to a local repository only for security data associated with messaging partners corresponding to identifying information in the batch listing.

18 Claims, 2 Drawing Sheets

OFFLINE MESSAGE SECURITY VIA SELECTIVE DATA REPLICATION

BACKGROUND OF THE INVENTION

1. Statement of the Technical Field

The present invention relates to message security, and more particularly to the offline securing of an electronic message.

2. Description of the Related Art

Electronic messaging applications, including electronic mail, text messaging and instant messaging, have proven to be the most widely used computing applications globally. Though electronic messaging applications, particularly electronic mail ("e-mail"), have been a commercial staple for several decades, due to the explosive popularity and global connectivity of the Internet, electronic messaging has become the preferred mode of communications, regardless of the geographic separation of communicating parties. Today, more electronic messages are processed in a single hour than phone calls. Clearly, electronic messaging as a mode of communications has been postured to replace all other modes of communications save for voice telephony.

Strictly speaking, electronic messages are documents which has been commonly formatted and which can be carried as a payload to a transport controlled message in an inter-process communications session between two or more computing devices. Messaging client software can be charged with the composition of the underlying payload and its configuration into a commonly recognizable format. Messaging client software further can be charged with the interpretation of a received message from its commonly known format into a presentable format which can be understood by the recipient.

Electronic messages, like their legacy counterparts, demand a high level of security in many circumstances. Unlike traditional paper messages, however, the identity of the author and/or the recipient cannot always be ascertained without difficulty. In addressing these difficulties, security technologies, including encryption and authentication, have been applied to the electronic messaging paradigm. In this regard, not only can the contents of a message be encrypted, potentially using highly secure, asymmetrical encryption techniques, but also the identity of the communicating parties can be assured through interactions with a certificate authority or some other such authenticating scheme.

To facilitate the signing and encryption of a message, or the authenticating and decryption of a received message, messaging systems—both client-side and server-side—can rely upon access to a centralized certificate authority acting as a common repository for publicly accessible encryption keys and certificates of identity. For occasional access, the use of a centralized certificate authority can suffice. For larger scale deployments, however, repeated access to a centralized certificate authority can be problematic in view of the resources required to repeatedly access a centralized data store of key and certificate information. Moreover, when a messaging client attempts to process a secure message while offline, it will not be possible to retrieve the necessary key and certificate information from a centralized repository.

To address the problem of incorporating messaging security to accommodate offline processing of secure messages, some messaging systems have included technology directed to security data replication, including key replication. In key replication, the content of a key store in an external certifying authority can be replicated to a local data store from which privately coupled clients can access the keys, whether online or offline. In this way, privately coupled clients need not access an external and remote network to locate a required key or certificate to process a secure message. The key replication process, itself, however, can be costly in terms of resource consumption. In fact, the size of the data retrieved from a remote key store can be staggering in that all keys are retrieved and stored during the replication process.

SUMMARY OF THE INVENTION

The present invention addresses the deficiencies of the art in respect to the offline securing of electronic messages and provides a novel and non-obvious method, system and apparatus for the offline securing of messages through selective security data replication. A method for selectively replicating security data for offline processing of electronic messages can include identifying a messaging partner associated with the electronic message responsive to processing an electronic message. In particular, the electronic message can be one of an electronic mail message, a text message, and an audible message. Subsequently, it can be determined whether electronic messages previously had been received from or transmitted to the identified messaging partner.

If it is determined that electronic messages previously had been received from or transmitted to the identified messaging partner, identifying information for the identified messaging partner can be added to a batch listing. Consequently, during a replication process, security data can be selectively replicated from an external repository to a local repository only for security data associated with messaging partners corresponding to identifying information in the batch listing. Preferably, the identifying step can include the step of, responsive to receiving an electronic message, identifying a messaging partner associated with the received electronic message. Alternatively, the identifying step can include the step of, responsive to processing an electronic message for transmission, identifying a messaging partner associated with the electronic message.

The replicating step can include the step of, during a replication process, selectively replicating public keys from an external repository to a local repository only for public keys associated with messaging partners corresponding to identifying information in the batch listing. Similarly, the replicating step can include the step of, during a replication process, selectively replicating digital certificates from an external repository to a local repository only for digital certificates associated with messaging partners corresponding to identifying information in the batch listing. In either case, the replicating step can include the step of, during a replication process, selectively replicating security data from an enterprise directory to a local directory only for security data associated with messaging partners corresponding to identifying information in the batch listing.

A system for selectively replicating security data for offline processing of electronic messages can include a message processing computing device configured for coupling to a plurality of message source/recipients and an external repository of security data over a data communications network. The system further can include a local repository coupled to the message processing computing device and configured to store security data replicated from the external repository. Finally, the system can include a selective key replicator programmed to selectively replicate security data in the external repository to the local repository based upon particular ones of the message source/recipients noted as first time message exchange partners with the message processing computing device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for securing electronic messages offline through selective security data replication. In accordance with the present invention, only those contacts which have acted as a source or a recipient of an electronic message with respect to a message user can have message security data replicated from an external repository to a local repository. Accordingly, by selectively replicating security data only for pertinent contacts, the replication process can become less resource consumptive while providing the message user with an opportunity to secure a message using the replicated security data in an offline mode without requiring an active network connection to the external repository.

Figure 1:
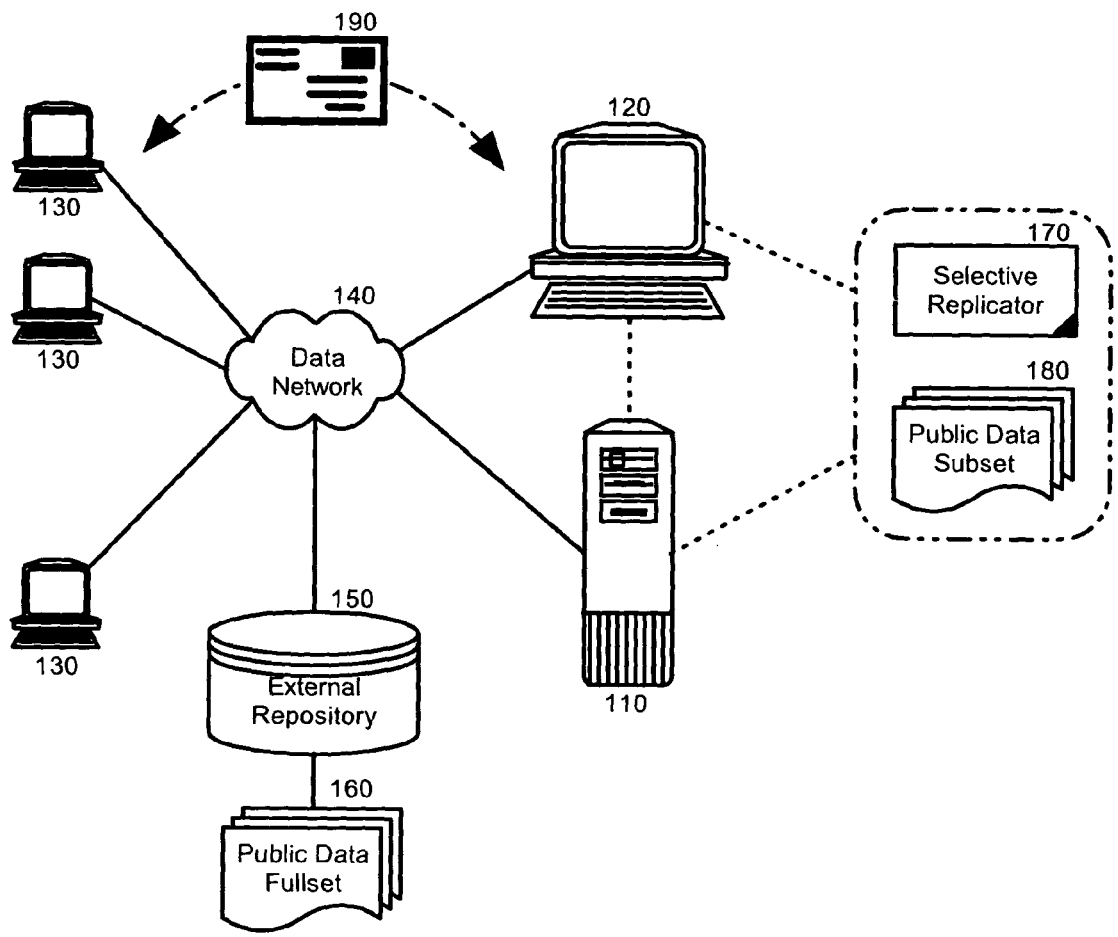
FIG. 1 is a schematic illustration of a messaging system configured for offline secure messaging processing via selective key replication; and, FIGS. 2A and 2B, taken together, are flow charts illustrating a process for offline secure messaging via selective key replication in the system of FIG. 1.

In more particular illustration of the foregoing inventive arrangement, FIG. 1 is a schematic illustration of a messaging system configured for offline secure messaging processing via selective key replication. The system can include a message server 110 coupled to one or more message source/recipients 130 acting as message exchange partners over a data communications network 140. The message server 110 can be configured for processing electronic messages, including instant messages, text messages, audible messages, e-mail and the like. In this regard, the message server 110 can receive electronic messages from the message source/recipients 130 for the benefit of one or more coupled messaging clients 120. Conversely, the message server 110 can transmit electronic messages to the message source/recipients 130 on behalf of one or more coupled messaging clients 120.

To facilitate the securing of messages when transmitting to the message source/recipients 130, either the message server 110 or the messaging clients 120 can access an external repository 150, such as an enterprise directory to retrieve entries from a full set of security data 160, including required public keys for encrypting the messages. Conversely, when processing secured messages received from the message source/recipients 130, either the message server 110 or the messaging clients 120 can access the external repository 150 to retrieve entries from a full set of security data 160 necessary to process the received messages. Notably, in order to offline process secure messages, a portion of the full set of security data 160 can be replicated to a subset of security data 170 within either the messaging server 110 or the messaging client 120.

The subset of security data 180 can be chosen based upon those message source/recipients 130 with whom electronic messages 190 have been exchanged. In this regard, whenever an electronic message 190 is received from or transmitted to a particular one of the message source/recipients 130 for the first time, the identity of the particular one of the message source/recipients 130 can be incorporated in a batch listing (not shown). Subsequently, when a selective replicator 170 in the message server 110 or messaging client 120 attempts to replicate the security data 160 from the external repository 150, only the security data for the message source/recipients 130 indicated in the batch listing can be replicated to the subset of security data 180.

Figure 2A:
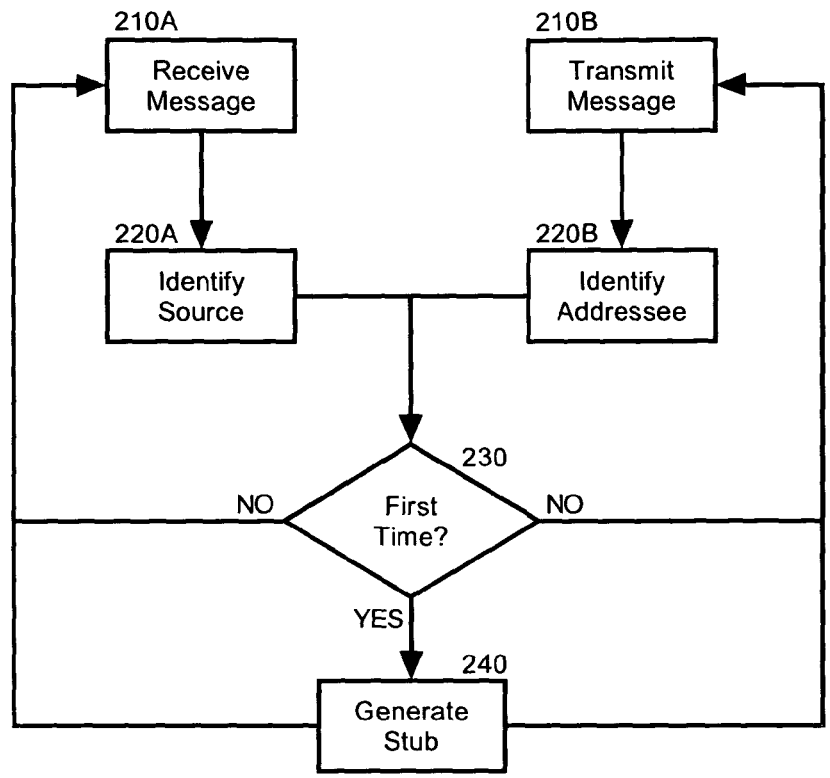
Figure 2B:
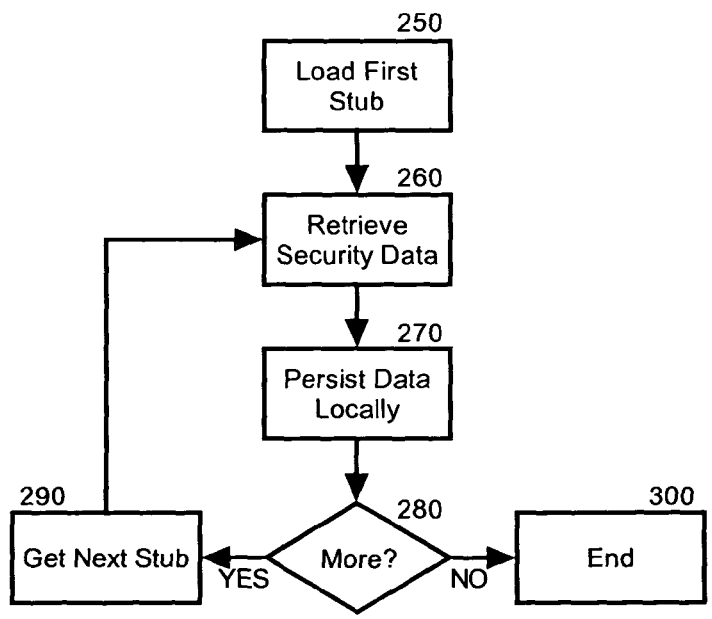

In more specific illustration of the process for selective replication and offline processing of secure messages, FIGS. 2A and 2B, taken together, are flow charts illustrating a process for offline secure messaging via selective key replication. Firstly referring to FIG. 2A, the process can begin either in block 210A in which an electronic message is received, or in block 210B in which an electronic message is transmitted or prepared for transmission. In block 220A, the source of a received electronic message can be identified. Similarly, in block 220B, the address of the transmitted message can be identified. In either case, in decision block 230 it can be determined if messages had previously been exchanged (meaning transmitted, received or both) with the identified source or address as the case may be. If so, the process can return to blocks 210A without further action on the part of the selective replicator. Otherwise, in block 240 an identity stub can be generated for the identified source or address.

Referring now to FIG. 2B, during the process of replicating security data from the external repository, in block 250 a first identity stub can be retrieved and in block 260, the security data can be retrieved from the external repository which corresponds to the identity stub. In block 270, the retrieved security data can be persisted locally so that the retrieved security data can be accessed offline in order to secure a message or to process a secured message. In decision block 280, if additional identity stubs remain to be processed, in block 290 a next stub can be retrieved and the process can repeat in blocks 260 through 290. Otherwise, when no additional identity stubs remain to be processed, in block 300 the selective replication process can end.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for selectively replicating security data for offline processing of electronic messages, the method comprising the steps of:
   responsive to processing an electronic message, identifying a messaging partner associated with said electronic message;
   determining whether electronic messages previously had been received from or transmitted to said identified messaging partner;
   if it is determined that electronic messages previously had been received from or transmitted to said identified messaging partner, adding identifying information for said identified messaging partner to a batch listing; and,
   during a replication process in which data is reproduced in multiple different locations to assure access to a synchronized instance of the data irrespective of a location of storage of the reproduced data, selectively replicating security data from an external repository to a local repository only for security data associated with messaging partners corresponding to identifying information in said batch listing.

2. The method of claim 1, wherein said identifying step comprises the step of, responsive to receiving an electronic message, identifying a messaging partner associated with said received electronic message.

3. The method of claim 1, wherein said identifying step comprises the step of, responsive to processing an electronic message for transmission, identifying a messaging partner associated with said electronic message.

4. The method of claim 1, wherein said electronic message is one of an electronic mail message, a text message, an instant message, and an audible message.

5. The method of claim 1, wherein said replicating step comprises the step of, during a replication process, selectively replicating public keys from an external repository to a local repository only for public keys associated with messaging partners corresponding to identifying information in said batch listing.

6. The method of claim 1, wherein said replicating step comprises the step of, during a replication process, selectively replicating digital certificates from an external repository to a local repository only for digital certificates associated with messaging partners corresponding to identifying information in said batch listing.

7. The method of claim 1, wherein said replicating step comprises the step of, during a replication process, selectively replicating security data from an enterprise directory to a local directory only for security data associated with messaging partners corresponding to identifying information in said batch listing.

8. A system for selectively replicating security data for offline processing of electronic messages, the system comprising:
   a message processing computing device configured for coupling to a plurality of message source/recipients and an external repository of security data over a data communications network;
   a local repository coupled to said message processing computing device and configured to store security data replicated from said external repository during a replication process in which data is reproduced in multiple different locations to assure access to a synchronized instance of the data irrespective of a location of storage of the reproduced data,; and,
   a selective key replicator programmed to selectively replicate security data in said external repository to said local repository based upon particular ones of said message source/recipients noted as first time message exchange partners with said message processing computing device.

9. The system of claim 8, wherein said message processing computing device is one of a message server and a messaging client.

10. The system of claim 8, wherein said security data comprises one of a public encryption key and a digital certificate.

11. The system of claim 8, wherein said external repository is an enterprise directory.

12. A machine readable storage medium storing a computer program for selectively replicating security data for offline processing of electronic messages, the computer program comprising a routine set of instructions which when executed by a machine cause the machine to perform the steps of:
   responsive to processing an electronic message, identifying a messaging partner associated with said electronic message;
   determining whether electronic messages previously had been received from or transmitted to said identified messaging partner;
   if it is determined that electronic messages previously had been received from or transmitted to said identified messaging partner, adding identifying information for said identified messaging partner to a batch listing; and,
   during a replication process in which data is reproduced in multiple different locations to assure access to a synchronized instance of the data irrespective of a location of storage of the reproduced data, selectively replicating security data from an external repository to a local repository only for security data associated with messaging partners corresponding to identifying information in said batch listing.

13. The machine readable storage of claim 12, wherein said identifying step comprises the step of, responsive to receiving an electronic message, identifying a messaging partner associated with said received electronic message.

14. The machine readable storage of claim 12, wherein said identifying step comprises the step of, responsive to processing an electronic message for transmission, identifying a messaging partner associated with said electronic message.

15. The machine readable storage of claim 12, wherein said electronic message is one of an electronic mail message, a text message, an instant message, and an audible message.

16. The machine readable storage of claim 12, wherein said replicating step comprises the step of, during a replication process, selectively replicating public keys from an external repository to a local repository only for public keys associated with messaging partners corresponding to identifying information in said batch listing.

17. The machine readable storage of claim 12, wherein said replicating step comprises the step of, during a replication process, selectively replicating digital certificates from an external repository to a local repository only for digital certificates associated with messaging partners corresponding to identifying information in said batch listing.

18. The machine readable storage of claim 12, wherein said replicating step comprises the step of, during a replication process, selectively replicating security data from an enterprise directory to a local directory only for security data associated with messaging partners corresponding to identifying information in said batch listing.

* * * * *